United States Patent [19]

Lessard

[11] Patent Number: 5,064,235
[45] Date of Patent: Nov. 12, 1991

[54] AUTOMATIC SLING LOCK

[75] Inventor: Michel Lessard, Hébertville, Canada

[73] Assignee: Less Micanik, Inc, Hébertville, Canada

[21] Appl. No.: 542,985

[22] Filed: Jun. 25, 1990

Related U.S. Application Data

[63] Continuation-in-part of Ser. No. 466,652, Jan. 17, 1990, abandoned.

[51] Int. Cl.$^5$ .................................................. B66C 1/38
[52] U.S. Cl. .................................. 294/82.14; 294/75; 294/82.32; 294/110.1
[58] Field of Search ........................................ 294/74–76, 294/82.14, 82.24–82.27, 82.32, 82.34, 82.36, 86.18, 86.19, 86.29–86.33, 110.1, 116

[56] References Cited

U.S. PATENT DOCUMENTS

| | | | |
|---|---|---|---|
| 1,426,563 | 8/1922 | Gariglio | 294/74 |
| 3,081,122 | 3/1963 | Jungersen | 294/82.32 |
| 3,163,401 | 12/1964 | Johnston et al. | 294/75 X |
| 4,130,313 | 12/1978 | Clifford | 294/82.32 |
| 4,358,144 | 11/1982 | Schmidt et al. | 294/82.14 |
| 4,417,758 | 11/1983 | Vaders | 294/82.14 |
| 4,637,643 | 1/1987 | Johnson et al. | 294/82.14 |

Primary Examiner—Johnny D. Cherry
Attorney, Agent, or Firm—Foley & Lardner

[57] ABSTRACT

Disclosed is a lock capable of being automatically bolted and released, and useful as a knot running along a loop made by a sling wound around a load to be dragged. The lock is made up of a keeper and of a bolt capable of fitting into it, the bolt having a radial lock face. A claw is mounted on the keeper. The claw is capable to move between a retracted position to allow insertion of the bolt in the keeper and an active position where it locks with the lock face, after the bolt has been inserted the keeper. In the active position, a spring device presses on the claw to draw the bolt fully in the keeper. The keeper is also provided with at least one pawl which is made to move between a retracted position, free of the bolt, and an active position where it stands in locking engagement upstream of the lock face. A damper device acts on each pawl for retarding radial movement thereof. According to a first embodiment, the lock is constructed so that each pawl moves in active position when the bolt is inserted into the keeper, and so that the movement of each pawl back to a retracted position is retarded when the sling to which the bolt is fastened, is abruptly pulled. According to a second embodiment, the lock is constructed so that each pawl moves in active position when the bolt is removed from the keeper and the movement of each pawl toward its active position is retarded sufficiently to cause locking engagement of the pawl with the lock face of the bolt only when the sling to which the bolt is fastened is gently pulled. Abrupt pulling in the first case, and gentle pulling in the second case, both cause each pawl to butt against the lock face of the bolt and thus to prevent removal of the bolt from the keeper so that the load may safely be dragged away, the noose around it being then safely tightened.

26 Claims, 7 Drawing Sheets

AUTOMATIC SLING LOCK

This is a continuation-in-part of application Ser. No. 07/466,652, filed Jan. 17, 1990, now abandoned.

BACKGROUND OF THE INVENTION

1. Field of the Invention

The present invention relates to a lock that can be bolted and released automatically and that serves as a knot running along a loop made by a sling wound around a load to be dragged, particularly a tree trunk.

2. Description of the Prior Art

In certain forestry operations, after a tree has been felled, it has to be dragged over a distance and this is achieved by means of a sling of which one end is wound over the drum of the power winch of a conventional vehicle and the other end is made as a noose around the lower end of the tree trunk by the vehicle driver. After the trunk is dragged to the desired location, the driver gets off the vehicle and walks to the tree trunk to loosen and remove the noose from it. This last operation is very often found inconvenient, however, as well as time-consuming.

SUMMARY OF THE INVENTION

It is consequently an object of the present invention to provide a noose-making lock for a sling which can be automatically bolted and particularly be automatically released without the driver having to step down from his vehicle and walk to the trunk side, that is to say, he can release the lock directly and automatically from his vehicle.

Another object of the invention is to provide a lock of the above type made up of a keeper and of a bolt fitting into the keeper.

In one embodiment, the lock is constructed so that once the bolt is inserted into the keeper, a sudden and rapid pull on the sling to one end of which the bolt is fixed, will firmly lock it in the keeper so that the tree trunk may safely be dragged over the ground to the desired location. However, when the strong pull pressure on the sling is loosened and the bolt gently pulled out of the keeper, the lock is automatically released and does not offer any resistance so that the sling may be unrolled from the trunk and wound on the vehicle winch with the vehicle driver remaining seated on his vehicle.

In another embodiment, the lock is constructed so that once the bolt is inserted into the keeper, a gentle pull on the sling and bolt fixed to it will firmly lock the bolt in the keeper. However, a strong and short pull applied to the sling to cause a sudden and rapid pull on the bolt will cause this bolt to be released.

More specifically, the invention provides a lock as referred to above, comprising a locking bolt to be secured to one end of a sling, the lock having a radial lock face, and a keeper for this bolt. The keeper is provided with first means including a claw movable between a retracted position allowing insertion of the bolt in the keeper and an active position where the claw is in locking engagement with the lock face, when the bolt is inserted in the keeper. Also included in the first keeper means are resilient means acting on the claw for drawing the bolt toward full insertion thereof in the keeper with the claw being in the aforesaid locking engagement. The lock is also provided with second means on the keeper which include at least one lock member movable between a retracted position where it allows insertion of the bolt in the keeper and an active position where it stands in locking engagement upstream of the lock face. The second keeper means also include damping means acting on the lock member for retarding some radial movement thereof.

According to a first embodiment, the lock is constructed so that each locking member moves in active position when the bolt is inserted into the keeper, and so that the movement of each locking member back to a retracted position is retarded when the sling to which the bolt is fastened, is abruptly pulled.

According to a second embodiment, the lock is constructed so that each locking member moves in active position when the bolt is removed from the keeper and the movement of each locking member toward its active position is retarded sufficiently to cause locking engagement of the locking member with the lock face of the bolt only when the sling to which the bolt is fastened is gently pulled. Abrupt pulling in the first case, and gentle pulling in the second case, both cause each pawl to butt against the lock face of the bolt and thus to prevent removal of the bolt from the keeper so that the load may safely be dragged away, the noose around it being then safely tightened.

Preferably, the first keeper means comprises an L-shaped lever having a longitudinal arm from which the claw radially projects and a radial arm having a free end mounted on the keeper for pivotal movement of the lever about an axis that extends transversally of the keeper, biasing means being provided on the lever for pivotally moving the claw to active position. In this case, the keeper may have the form of a hollow cylinder formed with a slot through its wall for the passage of the claw as it moves between its retracted and active positions.

Preferably also, the lock member of the second keeper means is in the form of a pivotable pawl and means are provided for pivotal movement about an axis extending transversally of the cylinder for displacement of the pawl between the pawl's retracted and active positions.

Other features and advantages of the invention will become apparent from the description that follows having reference to the appended drawings.

DESCRIPTION OF THE PREFERRED EMBODIMENTS

Figure 1:
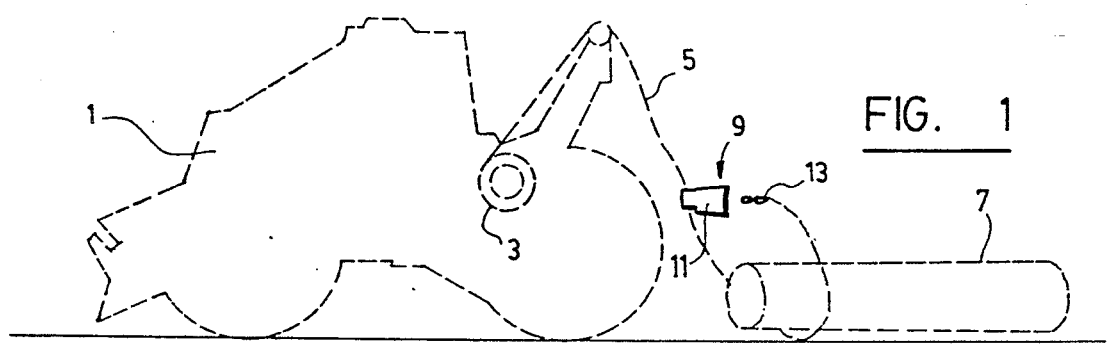
FIG. 1 is a diagrammatic elevation view of a sling having a lock according to the invention, the sling being wound at one end as a noose around a tree trunk to be dragged and being mounted at the other end, on the winch of a vehicle.
Figure 2:
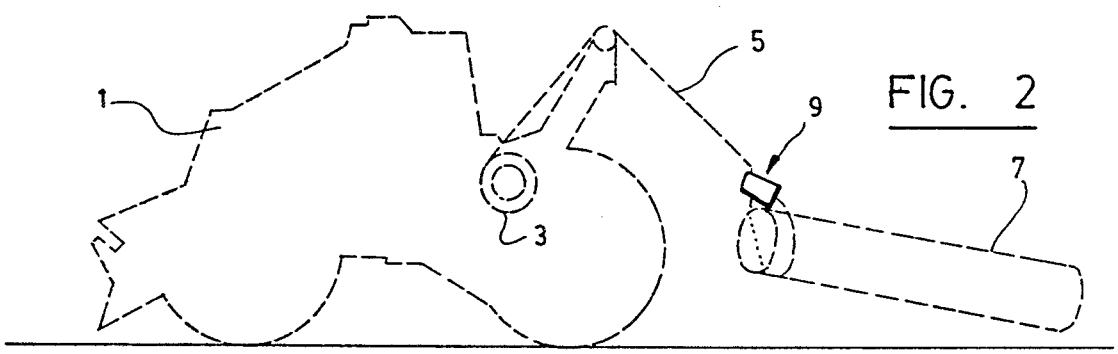
FIG. 2 is a view like that of FIG. 1 with the sling noose made tight around the trunk by the vehicle winch.

FIGS. 1 and 2 show a tracting vehicle 1 provided with a power winch 3 having a sling 5 making a loop around a tree trunk 7. The sling is equipped, at one end, with a lock 9 made according to the invention and acting as a running knot. The lock is of the type including a keeper 11 and a bolt 13 insertable in the keeper. In FIG. 1, the bolt 13 is shown about to be inserted and held in the keeper 11. Once it is inserted, the lock 9 is slid by hand along the sling 5 until it reaches the trunk 7, as shown in FIG. 2. Thereafter, the sling may be pulled by the winch 3 so as to lock the bolt 13 safely and automatically in the keeper 11, as will be explained hereinafter in greater details.

Figure 3:
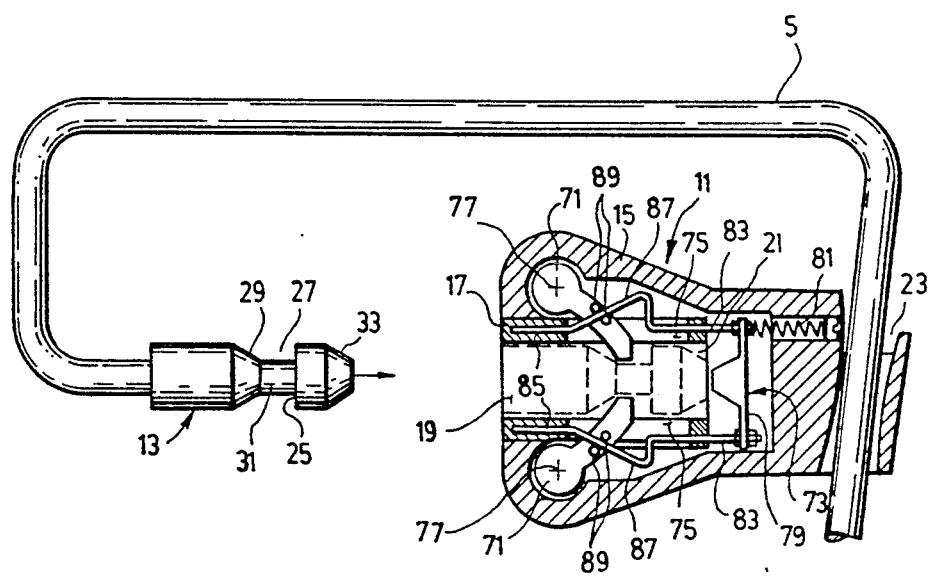
FIG. 3 is a diagrammatic view of a lock made according to the first embodiment of the invention with the bolt of this lock fixed to a sling and its keeper shown in longitudinal cross-section.
Figure 4:
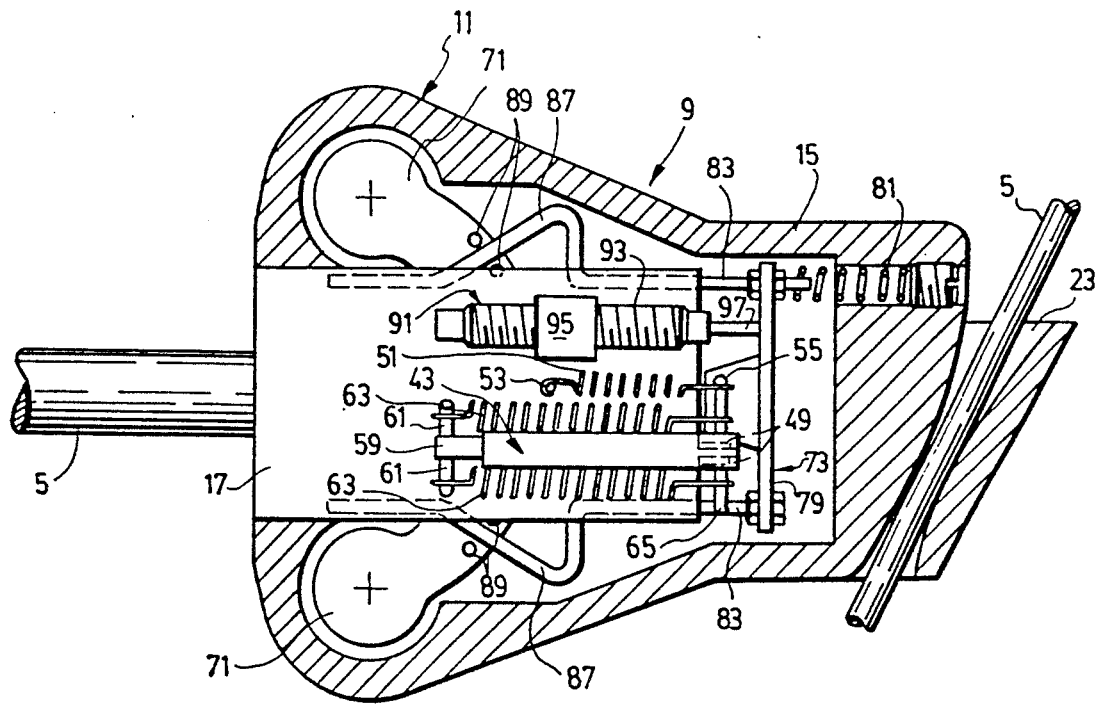
FIG. 4 is an enlarged view of the lock shown in FIG. 3, with the keeper outer body shown in longitudinal cross-section and the keeper cylinder shown in side elevation.

FIGS. 3 and 4 shows a lock 9 made according to the first embodiment of the invention as mentioned hereinabove. The keeper 11 of this lock is seen to comprise a partially hollowed outer metallic body 15 and a central hollow open-ended metallic cylinder 17 (see also FIG. 5) solid with the outer body 15, the cylinder having a bolt-insertion end 19 and an inner end 21. The outer body 15 defines a transverse passage 23 through which the sling 5 may slide. The bolt 13 is an essentially cylindrical solid metal body having a radial annular lock face 25, intermediate its ends, formed by a constriction 27 of its body also defining a rearwardly sloping ramp 29 and a central core 31. The upstream end 33 of the bolt is preferably frusto-conical.

Referring to FIGS. 4 and 5, the first means mentioned hereinabove as being provided on the keeper 11, more specifically on the cylinder 17, include a claw 35 which is movable between a retracted position allowing insertion of the bolt 13 in the keeper cylinder 17 and an active position where its upstream edge 37 is in locking engagement with the lock face 25 of the bolt 13. The first keeper means also include a resilient assembly of means 39, described more fully herein below, adapted to act on the claw 35 to draw the bolt 13 toward full insertion in the keeper cylinder. As best seen in FIG. 5, the claw 35 projects radially from the longitudinal arm 41 of an L-shaped lever 43 also having a radial arm 45 of which the free end is mounted on the keeper cylinder 17 for pivotal movement of the lever about an axis 47 extending transversally of the keeper cylinder. For this purpose, the said free end of the radial arm 45 is mounted on a pair of spaced bracket plates 49 (FIG. 4) solid with the cylinder 17. The lever 43 is biased for pivotally moving the claw 35 counterclockwise, for engagement of its upstream edge 37 with the lock face 25, by a spring 51 (FIG. 4) of which one end is fixed to a peg 53 of the cylinder 17 and the other end to the lever 43 at the junction of its two arms 41, 45, via a lateral pin 55. Movement of the claw 35 into the cylinder 17 is through a wall slot 57 (FIG. 5).

The longitudinal arm 41 of the lever 43 is in the form of a hollow tube having an open end and into which tube is slid a rod 59. The claw 35 is solid with and radially depends from this rod. It extends out of the tube through an appropriate slot (not shown) which also allows it to move lengthwise of the tube. Lateral pins 61 project from the outer end of the rod 59 and two return springs 63 are connected at one end to these pins 61 while their other ends are connected respectively to the aforesaid pin 55 and to a coaxial pin 65, both fixed to the lever 43 at the junction of the arms 41, 45. This return spring means or arrangement allows the rod 59 to be forced into the tube 41.

With the above arrangement in mind, it will be appreciated that the lever 43 is able to swing the claw 35 in and out of the keeper cylinder 17 as well as allow it to move lengthwise of its tubular longitudinal arm 41.

Figure 5A:
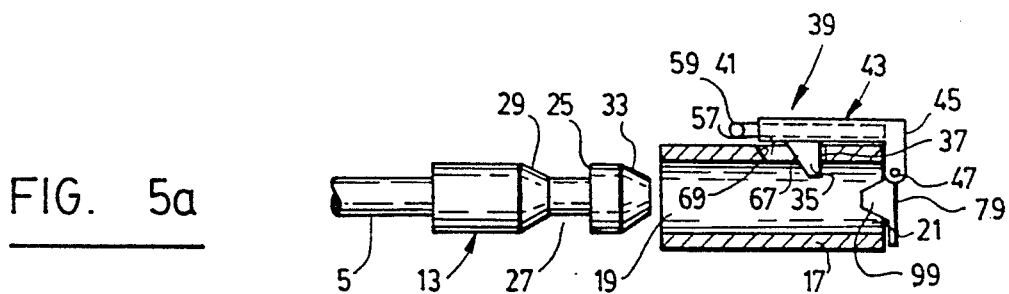
FIGS. 5a through g are diagrammatic side elevation views of the lock of FIGS. 3 and 4, showing successive steps of insertion and withdrawal of the bolt into the keeper cylinder, in relation to the function of the keeper claw.
Figure 5B:
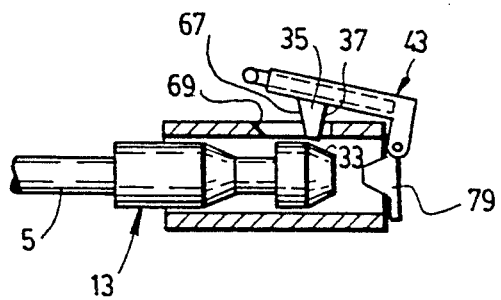

To help in moving the claw 35 out of the cylinder 17, for insertion of the bolt 13, the claw has an inclined upstream edge 67 capable of sliding over the inclined upstream edge 33 of the bolt 13 (FIG. 5b). Likewise, as the bolt is removed from the cylinder, the inclined edge 67 slides over an inclined edge 69 of the slot 57 (FIG. 5f).

Figure 6A:
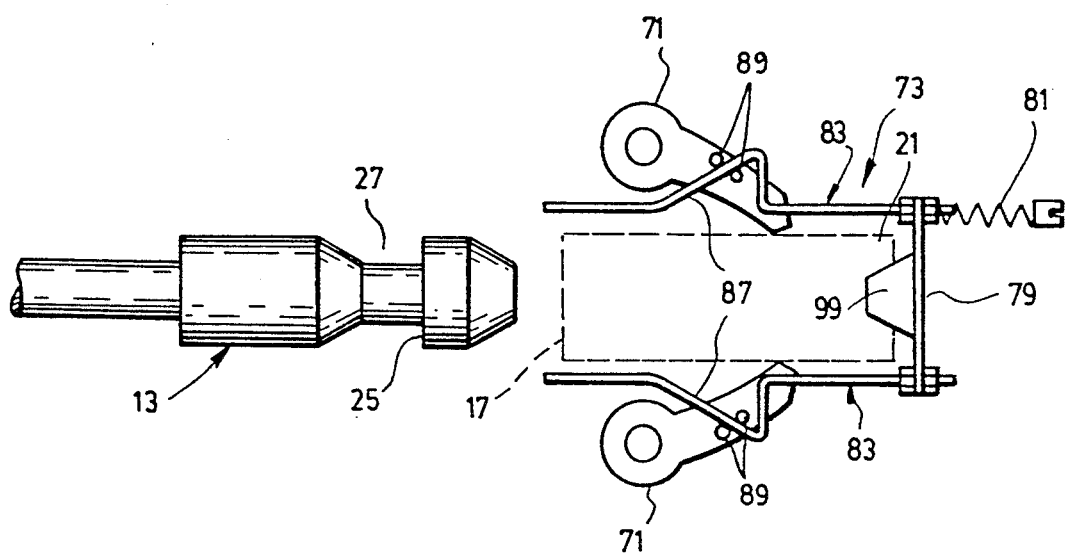
FIGS. 6a through d are views similar to those of FIG. 5 but with the lock of FIGS. 3 and 4 turned about 90° and shown in relation to the function of the locking pawls.
Figure 6B:
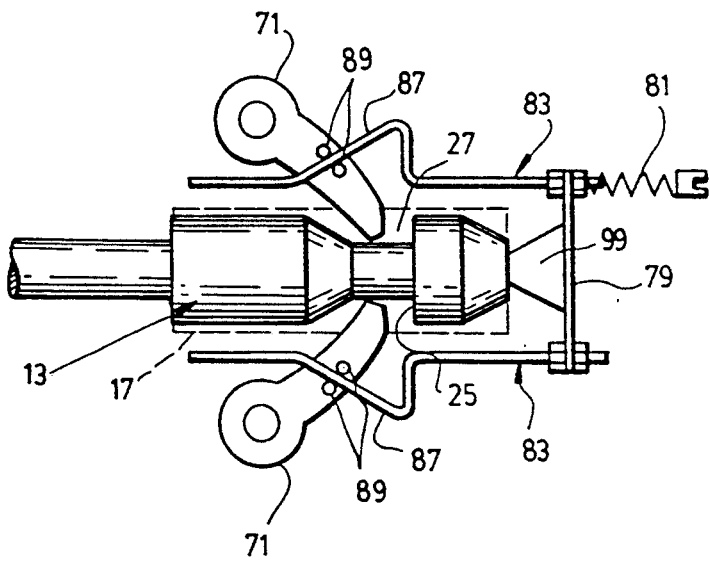

Referring to FIGS. 3 and 4, the second keeper means of the lock according to the first embodiment of the invention comprise at least one and preferably two lock members in the form of pawls 71 which are, as is the case with the claw 35, movable between a retracted position out of the cylinder 17 to allow for the insertion of the bolt 13 (FIGS. 6a and d) in the cylinder, and an active position where the pawls 71 are located upstream of the lock face 25 (FIGS. 6b and c).

The second keeper means further include a damping means or mechanism 73 capable of acting on the pawls 71 for retarding their radial motion, toward retracted position, sufficiently to cause the pawls 71 to butt against and thus lock with the lock face 25 when the bolt 13 is shifted abruptly upstream, that is, in the direction outward of the cylinder 17. In this manner, the bolt 13 becomes automatically locked within the keeper cylinder 17 and the tree trunk 7 may safely be dragged away.

In the illustrated preferred embodiment, the cylinder 17 is formed with a pair of elongated axial cuts 75 (FIG. 3) for the passage of the pawls. The latter are mounted, in any convenient manner, within the hollowed outer body 15 of the keeper 11 for pivotal movement about axes 77, extending transversally of the cylinder 17, so that they may move between their retracted and active positions.

The shown damping mechanism 73 of the second keeper means comprises a butt plate 79, located at the inward end 21 of the cylinder, which is resiliently biased toward the end 21 by a spring 81 between it and the keeper body 15. The plate 79 is guided, in its displacements, by a pair of pawls actuating elongated members in the form of rods 83 secured at one end to the plate 79, to project perpendicularly from one of its faces, and slidable in appropriate axial slots 85 (FIG. 3) of the cylinder 17. The rods 83 are formed, intermediate their ends, with ramp sections 87 that project radially away from the cylinder and slope down toward the bolt insertion end 19; each of the ramp sections being further slidably inserted between a pair of guide pins 89 projecting laterally from the pawls 71.

Figure 6C:
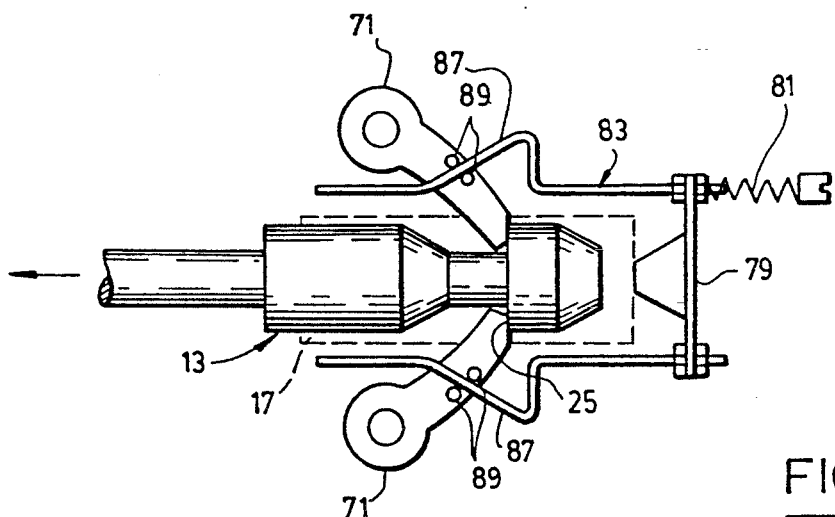

In this manner, and as will be explained further later, when the butt plate 79 is pushed by the spring 81, the ramp sections 87 move the pawls toward their retracted positions and when the butt plate is shifted in reverse direction by the bolt 13, the ramp sections 87 force the pawls inside the cylinder 17, within the bolt constriction 27, in front of the lock face 25. This latter movement is, however, prevented, when the bolt 13 is shifted outward rapidly, by a damping device 91, having a cylinder 93 screwed into a receiving bracket 95 fixed on the cylinder 17 and a rod 97 of which the free end is secured to the butt plate 79. This damper device is of a conventional type allowing easy withdrawal of the rod 97 from the damper cylinder 93 but adequately slowing down its insertion so as to cause abutment of the free ends of the pawls 71 against the lock face 25 of the bolt (FIG. 6c). In this manner, the bolt 13 remains imprisoned in the keeper 11.

A description now follows of the phases of the operation of the automatic lock according to the first embodiment of the invention, as shown in FIGS. 3 and 4. These phases of operation are shown in FIGS. 5 and 6.

In FIG. 5a, the locking bolt 13 lies outside of the cylinder 17; the claw 35 is in rest position within the cylinder under the action of the spring 51 (FIG. 4) biasing the lever 43 counterclockwise, and the butt plate 79 rests against the inward end 21 of the cylinder under the bias of the spring 81 (FIG. 4). The butt plate preferably has a butt nose 99.

In FIG. 5b, the bolt 13 is partially pushed in the cylinder and its sloping end 33 has forced clockwise pivoting of the claw 35 by engagement with the claw's inclined edge 67.

Figure 5C:
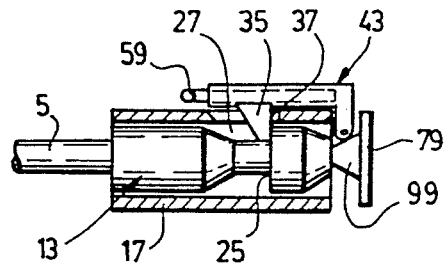

In FIG. 5c, the claw 35 has pivoted back and has moved into the constriction 27 and its upstream edge 37 has come in locking engagement with the lock face 25 of the bolt 13. Under the action of the return springs 63 (FIG. 4), acting on the rod 59, the claw has moved the bolt 13 into full insertion, moving the butt plate 79 away from the cylinder 17 against the spring 81. At the same time, the plate 79 has caused the pawls 71 also to move within the constriction 27, as will be seen hereinafter.

Figure 5D:
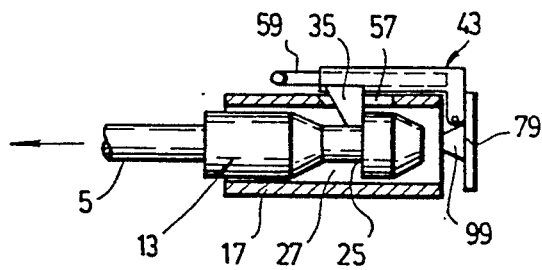
Figure 5E:
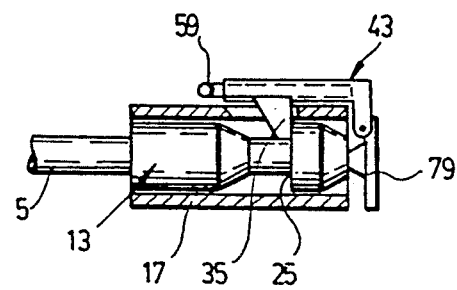
Figure 5F:
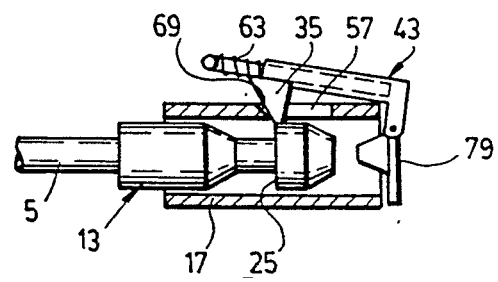

Now, if a fast and strong pull force is applied by the sling 5 through the power winch 3, as in FIG. 5d, the reaction is that the claw 35 is moved immediately and rapidly leftward or upstream by sliding along the slot 57. Because of its connection to the damper device 91, the butt plate 79 is however held essentially stationary so that the pawls 71 remain in the constriction 27 and become locked therein by engagement with the lock face 25 of the bolt, as will also be seen later. The bolt 13 is then safely locked in the keeper cylinder 17 and the tree trunk may be dragged away. After the trunk has been carried to the desired location, the winch is made to relax its pull on the bolt which then moves forward under the action of the claw 35 biased by the springs 63. The situation is that in FIG. 5e.

Figure 5G:
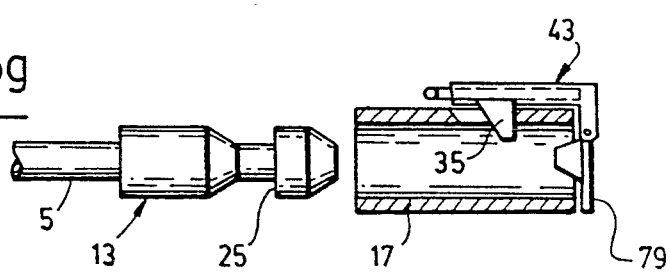

If again the winch pulls on the bolt 13, but slowly to move it out of the cylinder 17, its lockface 25 forces the claw 35 leftward against the return springs 63 and finally out of the cylinder by sliding over the inclined edge 69 of the slot 57, as seen in FIG. 5f. Once the bolt 13 is out of the cylinder 17, the claw 35 returns into it under the action of the lever pivoting spring 51 and of the return springs 63, as shown in FIG. 5g.

FIG. 6 is intended mainly to show the operation of the damping means 73 described above.

When the bolt 13 is out of the cylinder 17, as in FIG. 6a, the spring 81 holds the butt plate 79 at the inward end 21 of the cylinder 17 and the pawls 71 are pivoted to their retracted position by the ramp sections 87 of the actuating rods 83 sliding between the guide pins 89.

Upon insertion of the bolt 13 fully in the cylinder 17, the butt nose 99 and plate 79 are moved away from it against the spring 81, as in FIG. 6b. This has forced the pawls to pivot to active position with their tips in the constriction 27 but slightly away from the lock face 25.

Sudden pull leftward on the bolt 13 brings its lock face 25 firmly against the tips of the pawls 71, as in FIG. 6c, which pawls have not had time to move to retracted position because of the retarding action of the damper device 91 on the butt plate 79 and actuating rods 83.

Upon relaxation of the pull on the bolt 13, the latter first moves rightward (FIG. 5e) with the pawls taking again the position of FIG. 6b where their tips stand slightly away from the lock face 25.

Figure 6D:
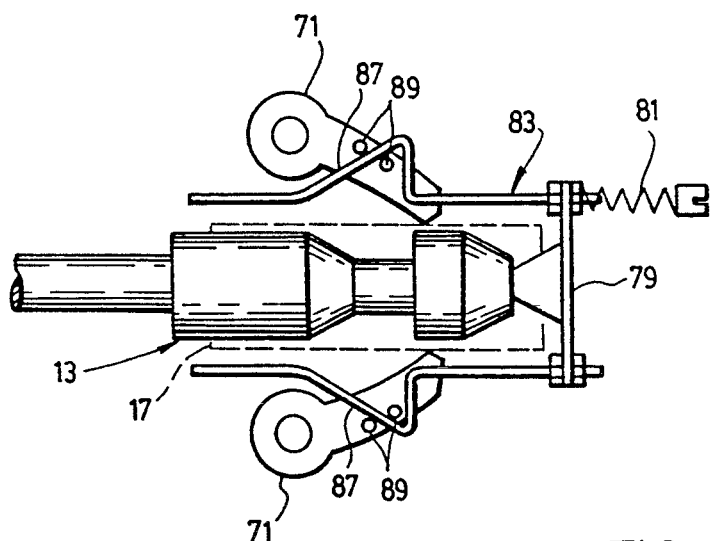

The bolt may then be moved out of the cylinder but slowly now so as to give the damper means 73 time to pivot the pawls 71 to retracted position, as in FIG. 6d, under the action of the spring 81 on the butt plate 79. As can be seen, the bolt 13 has been automatically freed from the keeper 11 by the driver directly from the vehicle and solely by controlling the winding speed of the winch.

As aforesaid, the lock according to the first embodiment of the invention may comprise one single pawl 71 instead of two as shown in FIGS. 3 to 6. In such a case of course, only one rod 83 will be necessary.

Figure 7:
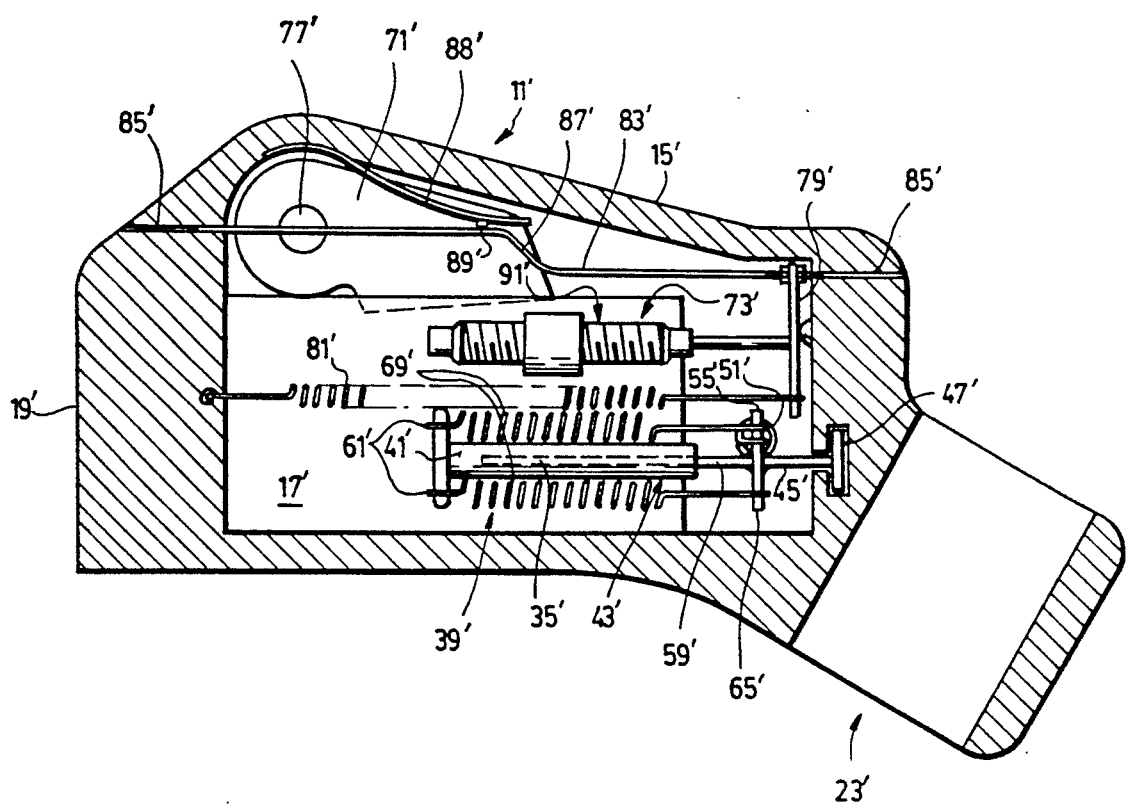
FIG. 7 is an enlarged view similar to the one of FIG. 4, showing a lock made according to the second embodiment of the invention with the keeper body of this lock shown in longitudinal cross-section and the keeper cylinder shown in side elevation.

FIGS. 7 and 8 shows a lock made according to the second embodiment of the invention as mentioned hereinabove. Since numerous structural elements of this lock are identical to those of the lock 9 according to the first embodiment of the invention as disclosed hereinabove, the same reference numerals with a distinguishing prime (') will be used to identify the same elements.

The lock made according to the second embodiment of the invention comprises a keeper 11' including a partially hollowed outer metallic body 15' in which is rigidly mounted a hollow open-ended metallic cylinder 17' provided with a bolt insertion end 19'.

The bolt 13' used with the keeper 11' is identical to the bolt 13 and needs not be further described.

The first means provided on the keeper 11', and more particularly on the cylinder 15', includes a claw 35' (shown in dotted lines in FIG. 7) and a resilient assembly of means 39' adapted to act on the claw 35' to draw the bolt 13' toward full insertion in the cylinder 17'. Of course, movement of the claw 35' into the cylinder 17' is through a wall slot (not shown).

The claw 35' projects radially from the longitudinal arm of an L-shaped lever 43'. The lever 43' has a radial arm 45' having a free end mounted in a T-shaped slot provided in the body 15' to allow pivotal movement of the lever about an axis 47' extending transversally of the cylinder. The lever 43' is biased for pivotally moving the claw 35' down into the cylinder 17' for engagement of its upperstream edge with the lock face 25' of the bolt 13', by means of a spring 51' having one end fixed to the bottom of the body 15' and its other end to the lever 43', via a lateral pin 55'.

The longitudinal arm of the lever 43' is telescopic and comprises a hollow tube 41' from which the claw 35' radially depends. The hollow tube 41' is capable to slide over a rod 59' connected to the lateral pin 55' and to the radial arm 45'.

Lateral pins 61' project from the outer end of the hollow tube 41' and two return springs 69' are connected at one end to these pins 61' and at their other end to the pins 55' to allow the hollow tube to be forced over the rod 59'.

With the above arrangement in mind, it will be appreciated that the lever 43' is able to swing the claw 35' in and out of the keeper cylinder 17' as well as to allow it as to move lengthwise of its tubular longitudinal arm 41'.

To help in moving the claw 35' out of the cylinder 17' for insertion of the bolt 13', the claw 35' may also be provided with an inclined stream edge capable of sliding over the inclined stream edge 33' of the bolt 13'. Likewise, as the bolt is removed from the cylinder, the inclined edge of the claw may slide over an inclined edge provided for this purpose in the slot provided in the cylinder 17'.

Except for its particular shape and positioning, the resilient assembly of means 39' has the same utility and works in the same way as the assembly of means 39 described hereinabove.

Figure 8A:
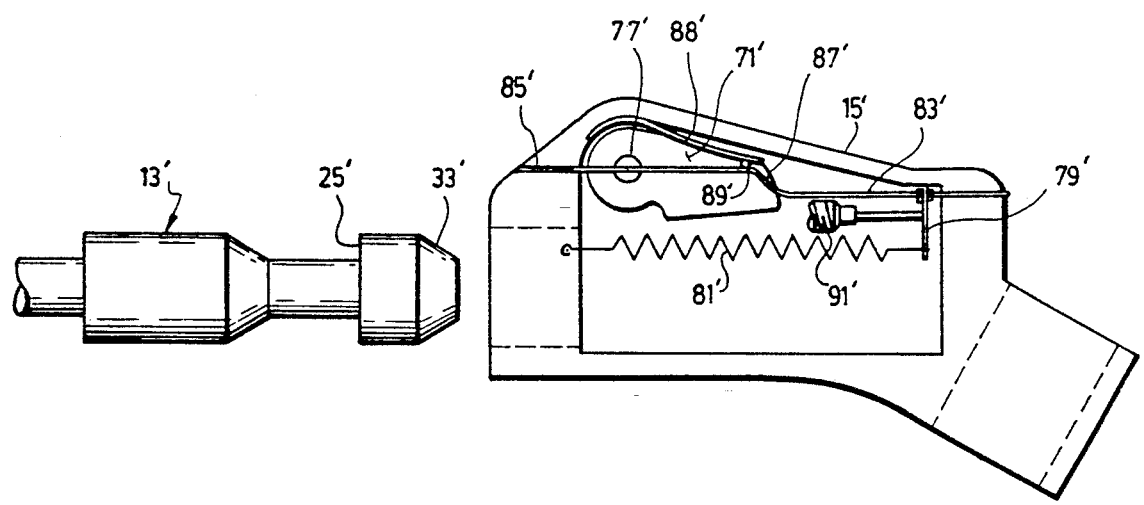
FIGS. 8a and b are views similar to those of FIGS. 6a to d, showing the function of the locking pawl of the lock shown in FIG. 7.
Figure 8B:
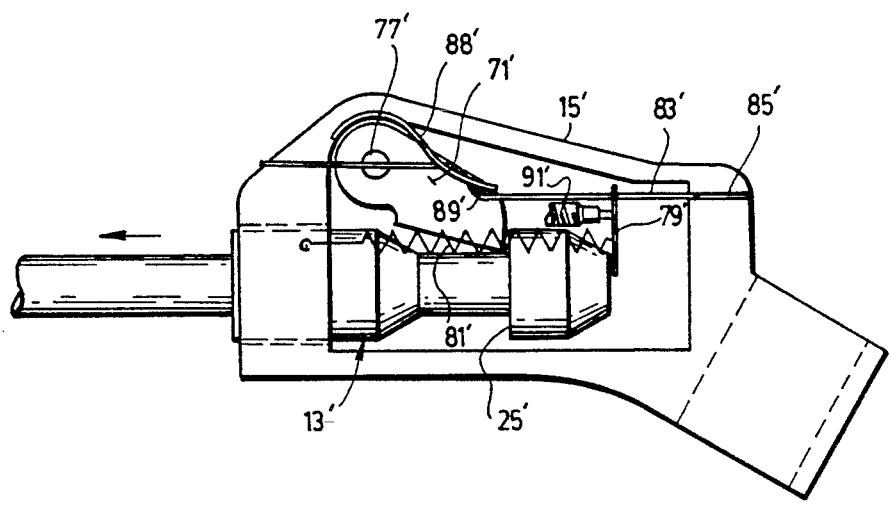

The second keeper means of the lock according to the second embodiment of the invention as shown in FIGS. 7 and 8, comprise one lock member in the form of a pawl 71' although two or more of such pawls may be used if desired. The pawl 71' is movable between a retracted position out of the cylinder 17' to allow for the insertion of the bolt upstream in the cylinder (FIG. 8a) and an active position where the tip of the pawl 71' is located upstream of the lock face 25' of the bolt (FIG. 8b). The second keeper means further includes a damping mechanism capable of acting on the pawl 71' for retarding its action motion towards its active position sufficiently to cause locking engagement of the pawl 71' with the lock face 25' of the bolt 13' only when the sling 5 to which the bolt 13' is fastened is gently pulled. In this manner, the bolt 13' becomes automatically locked within the cylinder 17' and the tree trunk 7 will be safely dragged away whenever the sleeve is abruptly pulled. If, however, the sling is released and gently pulled, the pawl 13' will have time to get out of the cylinder 17' and thus be free to escape from this cylinder before the pawl 71' moves in its active position. In other words, the lock according to the second embodiment of the invention works in an opposite manner as compared to the lock according to the first embodiment of the invention.

The second keeper means further includes a damping device 73' capable of acting on the pawl for retarding its radial motion toward its active position sufficiently to cause it to butt against and thus lock with the lock face 25' of the bolt 13' only when this bolt 13' is pulled gently and/or slowly upstream, that is in the direction outward of the cylinder 17'. In this manner, the bolt 13' becomes automatically locked within the cylinder 17' and the tree trunk 7 may be safely dragged away only if the sling is abruptly pulled. However, the bolt 13' is free to move out of the cylinder 17' and thus to release the tree trunk if the sling is gently pulled.

Of course, the cylinder 17' is formed with an elongated axial cut (not shown) for the passage of the pawl 71' which is mounted within the hollowed body 15' for pivotal movement about an axis 77' extending transversally to the cylinder 17'.

The damping mechanism 73' of the second keeper means comprises a butt plate 79' located at the other end of the cylinder. The butt plate 79' is resiliently biased toward this other end by a spring 81' having one end attached to the plate 79' and the other end attached to the body 15' adjacent the bolt insertion end 19' of the cylinder. The plate 79' is guided in its deplacement by a pawl-actuating elongated member in the form of a rod 83' secured at one end of the plate 79' and projecting perpendicularly from this plate, the ends of the rod being slidably mounted into axial guiding holes 85' provided into the body 15'. The rod 83' is formed, intermediate its end, with a ramp section 87' that projects radially away from the cylinder and slopes upwardly toward the bolt insertion end 19'.

Resilient means in the form of a small metal blade 88' are provided to bias the pawl 71' about its pivotal axis 77' toward the cylinder 17'. The metal blade 88' has one end rigidly connected to the body 15' and the other end bearing against a guide pin 89' vertically projecting from the pawl 71'. The location of the pin 89' and of the metal blade 88' is selected to cause the guide pin 89' to permanently bear against the ramp section 87'.

In this manner, when the butt plate 79' is pulled by the spring 81' toward the insertion end 19' of the cylinder, the ramp section 87' allows the pawl 71' to move toward its active position (FIG. 8b). When the butt plate is however shifted in the reverse direction by the bolt 13', the ramp section 87' forces the pawl 71' outside of the cylinder 17', out of the path of the lock face 25'.

The movement of the pawl 71' in active position is retarded, when the bolt 13' is shifted outwardly in a slow manner, by a damping device 91' identical in shape, mounting and operation to the damping device 91 of a first embodiment of the invention.

As can now be understood, the damping device 91' prevents pivotal movement of the pawl 71' toward its active position and thus prevents the pawl to butt again the lock face of the lock bolt and thus to hold the bolt in the keeper when this bolt is pulled gently out of the cylinder.

Accordingly, as it may now be understood, the lock according to the second embodiment of the invention works in an inverse manner as compared to the lock according to the first embodiment of the invention. Indeed, once the bolt 13' is inserted into the keeper, a gentle pull on the sling and bolt fixed to it will firmly lock the bolt in the keeper. However, a strong and short pull applied to the sling to cause a sudden and rapid pull with cause the bolt to be released.

What is claimed is:

1. A lock, capable of being automatically bolted and released, for use as a knot running along a loop made by a sling wound around a load to be dragged, said lock comprising:

a locking bolt to be secured to one end of said sling and formed with a radial lock face;

a keeper for said bolt;

a first means on said keeper including a claw movable between a retracted position allowing insertion of said bolt in said keeper and an active position where said claw is in locking engagement with said lock face, when said bolt is inserted in said keeper;

wherein said first keeper means further include resilient means acting on said claw for drawing said bolt toward full insertion thereof in said keeper with said claw being in said locking engagement; and second means on said keeper including at least one lock member movable between a retracted position where said lock member allows insertion of said bolt in said keeper and an active position where said lock member stands upstream of said lock face when said bolt is inserted in said keeper;

wherein said second keeper means further include damping means acting on said lock member for retarding radial movement thereof, toward said retracted position, sufficiently to cause locking engagement of said lock member with said lock face when said bolt is shifted abruptly in a direction outward of said keeper, thereby preventing withdrawal of said bolt.

2. A lock as claimed in claim 1, wherein:

said keeper has a longitudinal axis extending in the direction of insertion of said bolt in said keeper;

said first keeper means comprise an L-shaped lever having a longitudinal arm from which said claw radially projects and a radial arm having a free end mounted on said keeper for pivotal movement of said lever about an axis extending transversally of said keeper, and means are provided for biasing said lever for pivotally moving said claw to said active position.

3. A lock as claimed in claim 2, wherein said keeper comprises a central hollow cylinder having said longitudinal axis and being adapted for receiving said bolt; said cylinder being formed with a slot through the wall thereof for the passage of said claw as said claw moves between the retracted and active positions thereof.

4. A lock as claimed in claim 3, wherein said longitudinal arm of said L-shaped lever comprises:

a hollow tube open at one end thereof;

a rod slid in said tube through said open end, said claw being solid with said rod and radially depending therefrom to extend into said keeper cylinder through said keeper cylinder slot, and return spring means connected to said rod and to said tube for forcing said rod into said tube, said return spring means acting as said resilient means acting on said claw for drawing said bolt toward full insertion thereof in said keeper.

5. A lock as claimed in claim 4, wherein said lever biasing means comprise spring means connected respectively to said keeper and to said lever for pivoting said lever about said transverse axis thereby moving said claw in said central cylinder through said slot and in said locking engagement with said lock face of said locking bolt.

6. A lock as claimed in claim 5, wherein:

said claw has a straight downstream radial edge, at one end, for coming in said locking engagement with said bolt lock face and an inclined upstream edge at the opposite end thereof, and said cylinder slot has an edge inclined correspondingly to said claw inclined edge and constructed to allow pivoting of said claw outwardly of said keeper cylinder against said lever biasing means as said locking bolt is moved in and out of said keeper cylinder through the open end thereof.

7. A lock as claimed in claim 3, wherein:

said claw has a straight downstream radial edge, at one end, for coming in said locking engagement with said bolt lock face and an inclined upstream edge at the opposite end thereof, and said cylinder slot has an edge inclined correspondingly to said claw inclined edge and constructed to allow pivoting of said claw outwardly of said keeper cylinder against said lever biasing means as said locking bolt is moved in and out of said keeper cylinder through the open end thereof.

8. A lock as claimed in claim 1, wherein said second keeper means comprise a pair of lock members and said keeper comprises a central hollow open-ended cylinder adapted for receiving said bolt through an insertion end thereof, said cylinder having a longitudinal axis and being formed with a pair of elongated cuts, parallel to said axis, for the passage of each lock member as said lock member moves between the retracted and active positions thereof.

9. A lock as claimed in claim 8, wherein each lock member is a pawl and wherein means are provided for mounting one end of each pawl for pivotal movement about an axis extending transversally of said cylinder for displacement of said pawl between said pawl's retracted and active positions.

10. A lock as claimed in claim 9, wherein said damping means comprise:

a butt plate at the other end of said cylinder opposite to said insertion end, and resilient means biasing said plate toward said other end;

a pair of spaced guide pins laterally projecting from each pawl, between the ends thereof;

elongated actuating member, for each pawl, said actuating member having one end secured to said butt plate to extend perpendicularly from a common face thereof; each actuating member forming, between the ends thereof, a ramp section projecting radially away from said cylinder and sloping down toward said bolt insertion end of said cylinder; each ramp section being slidably mounted between the guide pins of the corresponding pawl;

guide means ensuring axial movement of said actuating members lengthwise of said cylinder;

whereby, when said butt plate is biased toward the other end of said cylinder by said plate resilient means, each ramp section causes pivoting of the corresponding pawl toward the retracted position thereof and when said butt plate is pushed by said locking bolt against the bias of said plate resilient means, each ramp section causes pivoting of the corresponding pawl towards the active position thereof, and a damper device acting as said damping means and connected respectively to said butt plate and to said cylinder, said device being constructed for retarding return motion of said plate toward the other end of said cylinder, thereby preventing pivotal movement of each pawl toward the retracted position thereof and causing said pawl to butt against said lock face of said locking bolt, thereby holding it in said keeper.

11. A lock as claimed in claim 10, wherein:

said first keeper means comprise an L-shaped lever having a longitudinal arm from which said claw radially projects and a radial arm having a free end mounted on said keeper for pivotal movement of said lever about an axis extending transversally of said keeper;

said cylinder is formed with a slot through the wall thereof for the passage of said claw as said claw moves between the retracted and active positions thereof; and means are provided for biasing said lever for pivotally moving said claw to said active position.

12. A lock as claimed in claim 11, wherein said longitudinal arm of said L-shaped lever comprises:

a hollow tube open at one end thereof;

a rod slid in said tube through said open end, said claw being solid with said rod and radially depending therefrom to extend into said keeper cylinder through said keeper cylinder slot, and return spring means connected to said rod and to said tube for forcing said rod into said tube, said return spring means acting as said resilient means acting on said claw for drawing said bolt toward full insertion thereof in said keeper.

13. A lock as claimed in claim 12, wherein:

said claw has a straight downstream radial edge, at one end, for coming in said locking engagement with said bolt lock face and an inclined upstream edge at the opposite end thereof, and said claw slot has an edge inclined correspondingly to said claw inclined edge and constructed to allow pivoting of said claw outwardly of said keeper cylinder against said lever biasing means as said locking bolt is moved in and out of said keeper cylinder through the open end thereof.

14. A lock, capable of being automatically bolted and released, for use as a knot running along a loop made by a sling wound around a load to be dragged, said lock comprising:

a locking bolt to be secured to one end of said sling and formed with a radial lock face;

a keeper for said bolt;

a first means on said keeper including a claw movable between a retracted position allowing insertion of said bolt in said keeper and an active position where said claw is in locking engagement with said lock face, when said bolt is inserted in said keeper;

wherein said first keeper means further include resilient means acting on said claw for drawing said bolt toward full insertion thereof in said keeper with said claw being in said locking engagement;

second means on said keeper including at least one lock member movable between a retracted position where said lock member allows insertion of said bolt in said keeper and an active position where said lock member stands in locking engagement upstream of said lock face when said bolt is inserted in said keeper;

wherein said second keeper means further include damping means acting on said lock member for retarding radial movement thereof toward its active position, sufficiently to cause locking engagement of said lock member with said lock face only when said bolt is pulled gently in a direction outward of said keeper, thereby preventing withdrawal of said bolt.

15. A lock as claimed in claim 14, wherein:

said keeper has a longitudinal axis extending in the direction of insertion of said bolt in said keeper;

said first keeper means comprise an L-shaped lever having a longitudinal arm from which said claw radially projects and a radial arm having a free end mounted on said keeper for pivotal movement of said lever about an axis extending transversally of said keeper, and means are pivoted for biasing said lever for pivotally moving said claw to said active position.

16. A lock as claimed in claim 15, wherein said keeper comprises a central hollow cylinder having said longitudinal axis and being adapted for receiving said bolt; said cylinder being formed with a slot through the wall thereof for the passage of said claw as said claw moves between the retracted and active positions thereof.

17. A lock as claimed in claim 16, wherein said longitudinal arm of said L-shaped lever comprises:

a hollow tube open at one end thereof;

a rod slid in said tube through said open end, said claw being solid with said rod and radially depending therefrom to extend into said keeper cylinder through said keeper cylinder slot, and return spring means connected to said rod and to said tube for forcing said rod into said tube, said return spring means acting as said resilient means acting on said claw for drawing said bolt toward full insertion thereof in said keeper.

18. A lock as claimed in claim 17, wherein said lever biasing means comprise spring means connected respectively to said keeper and to said lever for pivoting said lever about said transverse axis thereby moving said claw in said central cylinder through said slot and in said locking engagement with said lock face of said locking bolt.

19. A lock as claimed in claim 18, wherein:

said claw has a straight downstream radial edge, at one end, for coming in said locking engagement with said bolt lock face and an inclined upstream edge at the opposite end thereof, and said claw slot has an edge inclined correspondingly to said claw inclined edge and constructed to allow pivoting of said claw outwardly of said keeper cylinder against said lever biasing means as said locking bolt is moved in and out of said keeper cylinder through the open end thereof.

20. A lock as claimed in claim 16, wherein:

said claw has a straight downstream radial edge, at one end, for coming in said locking engagement with said bolt lock face and an inclined upstream edge at the opposite end thereof, and said cylinder slot has an edge inclined correspondingly to said claw inclined edge and constructed to allow pivoting of said claw outwardly of said keeper cylinder against said lever biasing means as said locking bolt is moved in and out of said keeper cylinder through the open end thereof.

21. A lock as claimed in claim 14, wherein said keeper comprises a central hollow open-ended cylinder adapted for receiving said bolt through an insertion end thereof, said cylinder having a longitudinal axis and being formed with an elongated cut, parallel to said axis, for the passage of said lock member as said lock member moves between the retracted and active positions thereof.

22. A lock as claimed in claim 21, wherein the lock member is a pawl and wherein means are provided for mounting one end of said pawl for pivotal movement about an axis extending transversally of said cylinder for displacement of said pawl between said pawl's retracted and active positions.

23. A lock as claimed in claim 22, wherein said damping means comprise:

a butt plate at the other end of said cylinder opposite to said insertion end, and resilient means biasing said plate toward said other end;

a guide pin laterally projecting from said pawl, an elongated actuating member for said pawl, said actuating member having one end secured to said butt plate to extend perpendicularly from a common face thereof; said actuating member forming, between the ends thereof, a ramp section projecting radially away from said cylinder and sloping down toward said other end of said cylinder;

resilient means biasing said pawl about its pivoted axis toward said cylinder, said pawl resilient means causing said guide pin to permanently bear against said ramp section;

guide means ensuring axial movement of said actuating member lengthwise of said cylinder;

whereby, when said butt plate is biased toward the other end of said cylinder by said plate resilient means, said ramp section allows said pawl to pivot under the action of said pawl resilient means toward the active position thereof where said pawl is in locking engagement with said bolt lock face and when said butt plate is pushed by said locking bolt against the bias of said plate resilient means, said ramp section forces said pawl to pivot against the action of said pawl resilient means toward the retracted position thereof, and a damper device acting as said damping means and connected respectively to said butt plate and to said cylinder, said device being constructed for retarding return motion of said plate toward the other end of said cylinder, thereby preventing pivotal movement of said pawl toward the active position thereof and thus preventing said pawl to butt against said lock face of said locking bolt and hold said bolt in said keeper.

24. A lock as claimed in claim 23, wherein:

said first keeper means comprise an L-shaped lever having a longitudinal arm from which said claw radially projects and a radial arm having a free end mounted on said keeper for pivotal movement of said lever about an axis extending transversally of said keeper;

said cylinder is formed with a slot through the wall thereof for the passage of said claw as said claw moves between the retracted and active positions thereof; and means are provided for biasing said lever for pivotally moving said claw to said active position.

25. A lock as claimed in claim 24, wherein said longitudinal arm of said L-shaped lever comprises:

a hollow tube open at one end thereof;

a rod slid in said tube through said open end, said claw being solid with said rod and radially depending therefrom to extend into said keeper cylinder through said keeper cylinder slot, and return spring means connected to said rod and to said tube for forcing said rod into said tube, said return spring means acting as said resilient means acting on said claw for drawing said bolt toward full insertion thereof in said keeper.

26. A lock as claimed in claim 25, wherein:

said claw has a straight downstream radial edge, at one end, for coming in said locking engagement with said bolt lock face and an inclined upstream edge at the opposite end thereof, and said cylinder slot has an edge inclined correspondingly to said claw inclined edge and is constructed to allow pivoting of said claw outwardly of said keeper cylinder against said lever biasing means as said locking bolt is moved in and out of said keeper cylinder through the open end thereof.

* * * * *